United States Patent
Van Wiemeersch et al.

(10) Patent No.: US 10,273,725 B2
(45) Date of Patent: Apr. 30, 2019

(54) CUSTOMER COACHING METHOD FOR LOCATION OF E-LATCH BACKUP HANDLES

(71) Applicant: Ford Global Technologies, LLC, Dearborn, MI (US)

(72) Inventors: John Robert Van Wiemeersch, Novi, MI (US); Robert Bruce Kleve, Ann Arbor, MI (US); Ronald Patrick Brombach, Plymouth, MI (US); Rajesh K. Patel, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 703 days.

(21) Appl. No.: 14/276,415

(22) Filed: May 13, 2014

(65) Prior Publication Data
US 2015/0330113 A1 Nov. 19, 2015

(51) Int. Cl.
*E05B 77/54* (2014.01)
*E05B 77/48* (2014.01)
(Continued)

(52) U.S. Cl.
CPC .............. *E05B 81/00* (2013.01); *B60K 35/00* (2013.01); *E05B 77/26* (2013.01); *E05B 77/48* (2013.01);
(Continued)

(58) Field of Classification Search
CPC ....... E05B 1/0084; E05B 81/64; B60K 35/00; Y10S 292/65
(Continued)

(56) References Cited

U.S. PATENT DOCUMENTS

| 2,229,909 A | 1/1941 | Wread |
| 3,479,767 A | 11/1969 | Gardner et al. |

(Continued)

FOREIGN PATENT DOCUMENTS

| CN | 1232936 C | 12/2005 |
| CN | 201198681 Y | 2/2009 |

(Continued)

OTHER PUBLICATIONS

Kistler Instruments, "Force Sensors Ensure Car Door Latch is Within Specification," Article, Jan. 1, 2005, 3 pages.
(Continued)

*Primary Examiner* — Carlos Lugo
(74) *Attorney, Agent, or Firm* — Vichit Chea; Price Heneveld LLP

(57) ABSTRACT

A powered door latch system for vehicles includes a controller configured to receive data concerning vehicle operating conditions. The door latch system also includes at least one electrically powered door latch having a powered actuator that can be actuated by the controller to unlatch the electrically powered latch. An emergency release is mechanically connected to the electrically powered latch to mechanically release the latch. The system also includes a user communication device such as a display screen that is operably connected to the controller. The user communication device provides a user with information concerning the location and/or operation of the emergency release if a predefined operating condition such as a loss of electrical power has occurred.

23 Claims, 4 Drawing Sheets

(51) Int. Cl.
| | |
|---|---|
| *E05B 81/00* | (2014.01) |
| *E05B 77/26* | (2014.01) |
| *B60K 35/00* | (2006.01) |
| *H04W 4/14* | (2009.01) |
| *E05B 81/90* | (2014.01) |
| *E05B 81/14* | (2014.01) |
| *E05B 81/82* | (2014.01) |

(52) U.S. Cl.
CPC .............. *E05B 77/54* (2013.01); *E05B 81/90* (2013.01); *H04W 4/14* (2013.01); *E05B 81/14* (2013.01); *E05B 81/82* (2013.01); *Y10T 292/57* (2015.04)

(58) Field of Classification Search
USPC ...................................................... 292/336.3
See application file for complete search history.

(56) References Cited

U.S. PATENT DOCUMENTS

| | | | |
|---|---|---|---|
| 3,751,718 A * | 8/1973 | Hanchett, Jr. ...... | G07C 9/00698 307/10.4 |
| 3,854,310 A | 12/1974 | Paull | |
| 3,858,922 A * | 1/1975 | Yamanaka ............. | E05B 53/00 292/221 |
| 4,193,619 A | 3/1980 | Jeril | |
| 4,206,491 A | 6/1980 | Ligman et al. | |
| 4,425,597 A * | 1/1984 | Schramm ........... | G07C 9/00682 307/10.4 |
| 4,457,148 A | 7/1984 | Johansson et al. | |
| 4,640,050 A | 2/1987 | Yamagishi et al. | |
| 4,672,348 A | 6/1987 | Duve | |
| 4,674,230 A | 6/1987 | Takeo et al. | |
| 4,674,781 A | 6/1987 | Reece et al. | |
| 4,702,117 A | 10/1987 | Tsutsumi et al. | |
| 4,848,031 A | 6/1989 | Yamagishi et al. | |
| 4,858,971 A * | 8/1989 | Haag .................. | E05B 77/48 292/201 |
| 4,889,373 A | 12/1989 | Ward et al. | |
| 4,929,007 A | 5/1990 | Bartczak et al. | |
| 5,018,057 A | 5/1991 | Biggs et al. | |
| 5,056,343 A | 10/1991 | Kleefeldt et al. | |
| 5,058,258 A | 10/1991 | Harvey | |
| 5,074,073 A | 12/1991 | Zwebner | |
| 5,239,779 A | 8/1993 | Deland et al. | |
| 5,263,762 A | 11/1993 | Long et al. | |
| 5,297,010 A | 3/1994 | Camarota et al. | |
| 5,332,273 A | 7/1994 | Komachi | |
| 5,334,969 A | 8/1994 | Abe et al. | |
| 5,494,322 A | 2/1996 | Menke | |
| 5,497,641 A | 3/1996 | Linde et al. | |
| 5,535,608 A * | 7/1996 | Brin ...................... | E05B 13/002 292/DIG. 14 |
| 5,547,208 A | 8/1996 | Chappell et al. | |
| 5,581,230 A * | 12/1996 | Barrett .................. | G08B 5/36 116/202 |
| 5,583,405 A | 12/1996 | Sai et al. | |
| 5,618,068 A | 4/1997 | Mitsui et al. | |
| 5,632,120 A | 5/1997 | Shigematsu et al. | |
| 5,632,515 A | 5/1997 | Dowling | |
| 5,644,869 A | 7/1997 | Buchanan, Jr. | |
| 5,653,484 A | 8/1997 | Brackmann et al. | |
| 5,662,369 A * | 9/1997 | Tsuge .................... | B60N 2/366 292/225 |
| 5,684,470 A | 11/1997 | Deland et al. | |
| 5,744,874 A | 4/1998 | Yoshida et al. | |
| 5,755,059 A | 5/1998 | Schap | |
| 5,783,994 A | 7/1998 | Koopman, Jr. et al. | |
| 5,802,894 A | 9/1998 | Jahrsetz et al. | |
| 5,808,555 A * | 9/1998 | Bartel ................... | E05B 77/48 307/10.2 |
| 5,852,944 A | 12/1998 | Collard, Jr. et al. | |
| 5,859,479 A * | 1/1999 | David ..................... | B60Q 1/46 292/DIG. 65 |
| 5,896,026 A | 4/1999 | Higgins | |
| 5,896,768 A | 4/1999 | Cranick et al. | |
| 5,901,991 A | 5/1999 | Hugel et al. | |
| 5,921,612 A | 7/1999 | Mizuki et al. | |
| 5,927,794 A * | 7/1999 | Mobius ................... | E05B 13/00 292/DIG. 14 |
| 5,964,487 A | 10/1999 | Shamblin | |
| 5,979,754 A | 11/1999 | Martin et al. | |
| 5,992,194 A | 11/1999 | Baukholt et al. | |
| 6,000,257 A | 12/1999 | Thomas | |
| 6,027,148 A | 2/2000 | Shoemaker | |
| 6,038,895 A | 3/2000 | Menke et al. | |
| 6,042,159 A | 3/2000 | Spitzley et al. | |
| 6,043,735 A * | 3/2000 | Barrett .................... | B60Q 3/217 180/271 |
| 6,050,117 A | 4/2000 | Weyerstall | |
| 6,099,048 A | 4/2000 | Salmon et al. | |
| 6,056,076 A | 5/2000 | Bartel et al. | |
| 6,065,316 A | 5/2000 | Sato et al. | |
| 6,072,403 A | 6/2000 | Iwasaki et al. | |
| 6,075,294 A | 6/2000 | Van den Boom et al. | |
| 6,089,626 A | 7/2000 | Shoemaker | |
| 6,091,162 A | 7/2000 | Williams, Jr. et al. | |
| 6,125,583 A | 10/2000 | Murray et al. | |
| 6,130,614 A * | 10/2000 | Miller .................... | E05B 83/26 340/425.5 |
| 6,145,918 A | 11/2000 | Wilbanks, II | |
| 6,157,090 A * | 12/2000 | Vogel ..................... | E05B 77/26 307/10.1 |
| 6,181,024 B1 * | 1/2001 | Geil ........................ | E05B 85/10 180/287 |
| 6,198,995 B1 | 3/2001 | Settles et al. | |
| 6,241,294 B1 | 6/2001 | Young et al. | |
| 6,247,343 B1 | 6/2001 | Weiss et al. | |
| 6,256,932 B1 | 7/2001 | Jyawook et al. | |
| 6,271,745 B1 | 8/2001 | Anazi et al. | |
| 6,341,448 B1 | 1/2002 | Murray | |
| 6,361,091 B1 | 3/2002 | Weschler | |
| 6,405,485 B1 | 6/2002 | Itami et al. | |
| 6,441,512 B1 | 8/2002 | Jakel et al. | |
| 6,460,905 B2 | 10/2002 | Suss | |
| 6,470,719 B1 | 10/2002 | Franz et al. | |
| 6,480,098 B2 | 11/2002 | Flick | |
| 6,515,377 B1 | 2/2003 | Uberlein et al. | |
| 6,523,376 B2 | 2/2003 | Baukholt et al. | |
| 6,550,826 B2 | 4/2003 | Fukushima et al. | |
| 6,554,328 B2 | 4/2003 | Cetnar et al. | |
| 6,556,900 B1 | 4/2003 | Brynielsson | |
| 6,602,077 B2 | 8/2003 | Kasper et al. | |
| 6,606,492 B1 | 8/2003 | Losey | |
| 6,629,711 B1 | 10/2003 | Gleason et al. | |
| 6,639,161 B1 | 10/2003 | Meagher et al. | |
| 6,657,537 B1 | 12/2003 | Hauler | |
| 6,659,515 B2 | 12/2003 | Raymond et al. | |
| 6,701,671 B1 | 3/2004 | Fukumoto et al. | |
| 6,712,409 B2 | 3/2004 | Monig | |
| 6,715,806 B2 | 4/2004 | Arlt et al. | |
| 6,734,578 B2 | 5/2004 | Konno et al. | |
| 6,740,834 B2 | 5/2004 | Sueyoshi et al. | |
| 6,768,413 B1 | 7/2004 | Kemmann et al. | |
| 6,779,372 B2 | 8/2004 | Arlt et al. | |
| 6,783,167 B2 * | 8/2004 | Bingle ..................... | B60Q 3/06 292/DIG. 43 |
| 6,786,070 B1 | 9/2004 | Dimig et al. | |
| 6,794,837 B1 | 9/2004 | Whinnery et al. | |
| 6,825,752 B2 | 11/2004 | Nahata et al. | |
| 6,829,357 B1 | 12/2004 | Alrabady et al. | |
| 6,843,085 B2 | 1/2005 | Dimig | |
| 6,854,870 B2 * | 2/2005 | Huizenga .............. | B60Q 1/2669 362/394 |
| 6,879,058 B2 | 4/2005 | Lorenz et al. | |
| 6,883,836 B2 | 4/2005 | Breay et al. | |
| 6,883,839 B2 | 4/2005 | Belmond et al. | |
| 6,914,346 B2 | 7/2005 | Girrd | |
| 6,923,479 B2 * | 8/2005 | Aiyama ................. | E05B 41/00 292/201 |
| 6,933,655 B2 | 8/2005 | Morrison et al. | |

(56) References Cited

U.S. PATENT DOCUMENTS

| | | | |
|---|---|---|---|
| 6,946,978 B2* | 9/2005 | Schofield | G01C 21/165 |
| | | | 340/988 |
| 7,005,959 B2 | 2/2006 | Amagasa | |
| 7,038,414 B2 | 5/2006 | Daniels et al. | |
| 7,055,997 B2* | 6/2006 | Baek | B60Q 3/267 |
| | | | 362/100 |
| 7,062,945 B2 | 6/2006 | Saitoh et al. | |
| 7,070,018 B2* | 7/2006 | Kachouh | E05B 81/14 |
| | | | 180/287 |
| 7,070,213 B2 | 7/2006 | Willats et al. | |
| 7,090,285 B2 | 8/2006 | Markevich et al. | |
| 7,091,823 B2 | 8/2006 | Ieda et al. | |
| 7,091,836 B2 | 8/2006 | Kachouh et al. | |
| 7,097,226 B2 | 8/2006 | Bingle et al. | |
| 7,106,171 B1 | 9/2006 | Burgess | |
| 7,108,301 B2 | 9/2006 | Louvel | |
| 7,126,453 B2 | 10/2006 | Sandau et al. | |
| 7,145,436 B2 | 12/2006 | Ichikawa et al. | |
| 7,161,152 B2 | 1/2007 | Dipoala | |
| 7,170,253 B2 | 1/2007 | Spurr et al. | |
| 7,173,346 B2 | 2/2007 | Aiyama et al. | |
| 7,176,810 B2 | 2/2007 | Inoue | |
| 7,180,400 B2* | 2/2007 | Amagasa | G07C 9/00682 |
| | | | 340/5.51 |
| 7,192,076 B2 | 3/2007 | Ottino | |
| 7,204,530 B2 | 4/2007 | Lee | |
| 7,205,777 B2 | 4/2007 | Schultz et al. | |
| 7,221,255 B2 | 5/2007 | Johnson et al. | |
| 7,222,459 B2 | 5/2007 | Taniyama | |
| 7,248,955 B2 | 7/2007 | Hein et al. | |
| 7,263,416 B2 | 8/2007 | Sakurai et al. | |
| 7,270,029 B1 | 9/2007 | Papanikolaou et al. | |
| 7,325,843 B2 | 2/2008 | Coleman et al. | |
| 7,342,373 B2 | 3/2008 | Newman et al. | |
| 7,360,803 B2 | 4/2008 | Parent et al. | |
| 7,363,788 B2 | 4/2008 | Dimig et al. | |
| 7,375,299 B1 | 5/2008 | Pudney | |
| 7,399,010 B2 | 7/2008 | Hunt et al. | |
| 7,446,645 B2* | 11/2008 | Steegmann | B60R 25/246 |
| | | | 340/5.6 |
| 7,576,631 B1 | 8/2009 | Bingle et al. | |
| 7,642,669 B2 | 1/2010 | Spurr | |
| 7,686,378 B2 | 3/2010 | Gisler et al. | |
| 7,688,179 B2 | 3/2010 | Kurpinski et al. | |
| 7,705,722 B2 | 4/2010 | Shoemaker et al. | |
| 7,747,286 B2 | 6/2010 | Conforti | |
| 7,780,207 B2* | 8/2010 | Gotou | E05B 79/20 |
| | | | 292/201 |
| 7,791,218 B2* | 9/2010 | Mekky | E05B 77/02 |
| | | | 307/10.1 |
| 7,926,385 B2 | 4/2011 | Papanikolaou et al. | |
| 7,931,314 B2 | 4/2011 | Nitawaki et al. | |
| 7,937,893 B2 | 5/2011 | Pribisic | |
| 8,028,375 B2 | 10/2011 | Nakaura et al. | |
| 8,093,987 B2* | 1/2012 | Kurpinski | B60R 25/2009 |
| | | | 340/426.15 |
| 8,126,450 B2 | 2/2012 | Howarter et al. | |
| 8,141,296 B2 | 3/2012 | Bem | |
| 8,141,916 B2 | 3/2012 | Tomaszewski et al. | |
| 8,169,317 B2 | 5/2012 | Lemerand et al. | |
| 8,193,462 B2 | 6/2012 | Zanini et al. | |
| 8,224,313 B2 | 7/2012 | Howarter et al. | |
| 8,376,416 B2 | 2/2013 | Arabia, Jr. et al. | |
| 8,398,128 B2 | 3/2013 | Arabia et al. | |
| 8,405,515 B2 | 3/2013 | Ishihara et al. | |
| 8,405,527 B2 | 3/2013 | Chung et al. | |
| 8,419,114 B2* | 4/2013 | Fannon | E05B 83/24 |
| | | | 180/69.2 |
| 8,451,087 B2 | 5/2013 | Krishnan et al. | |
| 8,454,062 B2 | 6/2013 | Rohlfing et al. | |
| 8,474,889 B2 | 7/2013 | Reifenberg et al. | |
| 8,532,873 B1* | 9/2013 | Bambenek | B62D 33/037 |
| | | | 296/26.04 |
| 8,534,101 B2 | 9/2013 | Mette et al. | |
| 8,544,901 B2 | 10/2013 | Krishnan et al. | |
| 8,573,657 B2 | 11/2013 | Papanikolaou et al. | |
| 8,616,595 B2 | 12/2013 | Wellborn, Sr. et al. | |
| 8,648,689 B2 | 2/2014 | Hathaway et al. | |
| 8,746,755 B2 | 6/2014 | Papanikolaou et al. | |
| 8,826,596 B2 | 9/2014 | Tensing | |
| 8,833,811 B2* | 9/2014 | Ishikawa | E05B 17/106 |
| | | | 292/336.3 |
| 8,903,605 B2* | 12/2014 | Bambenek | G07C 5/008 |
| | | | 16/308 |
| 8,915,524 B2* | 12/2014 | Charnesky | E05B 79/20 |
| | | | 292/216 |
| 8,963,701 B2* | 2/2015 | Rodriguez Barros | |
| | | | B60Q 1/2665 |
| | | | 340/438 |
| 8,965,287 B2 | 2/2015 | Lam | |
| 9,076,274 B2 | 7/2015 | Kamiya | |
| 9,159,219 B2 | 10/2015 | Magner et al. | |
| 9,184,777 B2 | 11/2015 | Esselink et al. | |
| 9,187,012 B2 | 11/2015 | Sachs et al. | |
| 9,189,900 B1 | 11/2015 | Penilla et al. | |
| 9,260,882 B2 | 2/2016 | Krishnan et al. | |
| 9,284,757 B2* | 3/2016 | Kempel | E05B 83/26 |
| 9,405,120 B2* | 8/2016 | Graf | G02B 27/0149 |
| 9,409,579 B2 | 8/2016 | Eichin et al. | |
| 9,416,565 B2 | 8/2016 | Papanikolaou et al. | |
| 9,518,408 B1 | 12/2016 | Krishnan | |
| 9,546,502 B2* | 1/2017 | Lange | E05B 85/08 |
| 9,551,166 B2 | 1/2017 | Patel et al. | |
| 9,725,069 B2 | 8/2017 | Krishnan | |
| 9,777,528 B2 | 10/2017 | Elie et al. | |
| 9,797,178 B2 | 10/2017 | Elie et al. | |
| 9,834,964 B2 | 12/2017 | Van Wiemeersch et al. | |
| 9,845,071 B1 | 12/2017 | Krishnan | |
| 9,903,142 B2 | 2/2018 | Van Wiemeersch et al. | |
| 9,909,344 B2 | 3/2018 | Krishnan et al. | |
| 9,957,737 B2 | 5/2018 | Patel et al. | |
| 2001/0005078 A1 | 6/2001 | Fukushima et al. | |
| 2001/0030871 A1* | 10/2001 | Anderson, Jr. | H01H 9/18 |
| | | | 362/488 |
| 2002/0000726 A1 | 1/2002 | Zintler | |
| 2002/0111844 A1 | 8/2002 | Vanstory et al. | |
| 2002/0121967 A1 | 9/2002 | Bowen et al. | |
| 2002/0186144 A1 | 12/2002 | Meunier | |
| 2003/0009855 A1 | 1/2003 | Budzynski | |
| 2003/0025337 A1 | 2/2003 | Suzuki et al. | |
| 2003/0038544 A1 | 2/2003 | Spurr | |
| 2003/0101781 A1 | 6/2003 | Budzynski et al. | |
| 2003/0107473 A1 | 6/2003 | Pang et al. | |
| 2003/0111863 A1 | 6/2003 | Weyerstall et al. | |
| 2003/0139155 A1 | 7/2003 | Sakai | |
| 2003/0172695 A1 | 9/2003 | Buschmann | |
| 2003/0182863 A1 | 10/2003 | Mejean et al. | |
| 2003/0184098 A1* | 10/2003 | Aiyama | B60R 21/0136 |
| | | | 292/216 |
| 2004/0061462 A1 | 4/2004 | Bent et al. | |
| 2004/0093155 A1 | 5/2004 | Simonds et al. | |
| 2004/0124708 A1 | 7/2004 | Giehler et al. | |
| 2004/0195845 A1 | 10/2004 | Chevalier | |
| 2004/0217601 A1 | 11/2004 | Garnault et al. | |
| 2005/0057047 A1 | 3/2005 | Kachouh | |
| 2005/0068712 A1 | 3/2005 | Schulz et al. | |
| 2005/0216133 A1* | 9/2005 | MacDougall | E05B 77/26 |
| | | | 701/1 |
| 2005/0218913 A1* | 10/2005 | Inaba | G01D 5/24 |
| | | | 324/678 |
| 2006/0056663 A1 | 3/2006 | Call | |
| 2006/0100002 A1 | 5/2006 | Luebke et al. | |
| 2006/0186987 A1 | 8/2006 | Wilkins | |
| 2007/0001467 A1 | 1/2007 | Muller et al. | |
| 2007/0090654 A1 | 4/2007 | Eaton | |
| 2007/0115191 A1 | 5/2007 | Hashiguchi et al. | |
| 2007/0120645 A1 | 5/2007 | Nakashima | |
| 2007/0126243 A1 | 6/2007 | Papanikolaou et al. | |
| 2007/0132553 A1 | 6/2007 | Nakashima | |
| 2007/0170727 A1 | 7/2007 | Kohlstrand et al. | |
| 2008/0021619 A1 | 1/2008 | Steegmann et al. | |
| 2008/0060393 A1 | 3/2008 | Johansson et al. | |

(56) References Cited

U.S. PATENT DOCUMENTS

| | | |
|---|---|---|
| 2008/0068129 A1 | 3/2008 | Ieda et al. |
| 2008/0129446 A1 | 6/2008 | Vader |
| 2008/0143139 A1 | 6/2008 | Bauer et al. |
| 2008/0202912 A1 | 8/2008 | Boddie et al. |
| 2008/0203737 A1 | 8/2008 | Tomaszewski et al. |
| 2008/0211623 A1 | 9/2008 | Scheurich |
| 2008/0217956 A1 | 9/2008 | Gschweng et al. |
| 2008/0224482 A1 | 9/2008 | Cumbo et al. |
| 2008/0230006 A1 | 9/2008 | Kirchoff et al. |
| 2008/0250718 A1 | 10/2008 | Papanikolaou et al. |
| 2008/0296927 A1 | 12/2008 | Gisler et al. |
| 2008/0303291 A1 | 12/2008 | Spurr |
| 2008/0307711 A1 | 12/2008 | Kern et al. |
| 2009/0033104 A1 | 2/2009 | Konchan et al. |
| 2009/0033477 A1 | 2/2009 | Illium et al. |
| 2009/0145181 A1 | 6/2009 | Pecoul et al. |
| 2009/0160211 A1 | 6/2009 | Krishnan et al. |
| 2009/0177336 A1 | 7/2009 | McClellan et al. |
| 2009/0240400 A1 | 9/2009 | Lachapelle et al. |
| 2009/0257241 A1 | 10/2009 | Meinke et al. |
| 2010/0007463 A1 | 1/2010 | Dingman et al. |
| 2010/0005233 A1 | 3/2010 | Arabia et al. |
| 2010/0052337 A1 | 3/2010 | Arabia, Jr. et al. |
| 2010/0060505 A1* | 3/2010 | Witkowski .............. G08C 17/02 341/176 |
| 2010/0097186 A1* | 4/2010 | Wielebski ............ G05B 19/409 340/10.1 |
| 2010/0175945 A1 | 7/2010 | Helms |
| 2010/0235057 A1 | 9/2010 | Papanikolaou et al. |
| 2010/0235058 A1 | 9/2010 | Papanikolaou et al. |
| 2010/0235059 A1 | 9/2010 | Krishnan et al. |
| 2010/0237635 A1 | 9/2010 | Ieda et al. |
| 2010/0253535 A1* | 10/2010 | Thomas .................. H04B 1/082 340/4.37 |
| 2010/0265034 A1 | 10/2010 | Cap et al. |
| 2010/0315267 A1* | 12/2010 | Chung .................... B60R 25/24 341/22 |
| 2011/0041409 A1 | 2/2011 | Newman et al. |
| 2011/0060480 A1 | 3/2011 | Mottla et al. |
| 2011/0148575 A1 | 6/2011 | Sobecki et al. |
| 2011/0154740 A1 | 6/2011 | Matsumoto et al. |
| 2011/0180350 A1 | 7/2011 | Thacker |
| 2011/0203181 A1 | 8/2011 | Magner et al. |
| 2011/0203336 A1 | 8/2011 | Mette et al. |
| 2011/0227351 A1 | 9/2011 | Grosdemouge |
| 2011/0248862 A1* | 10/2011 | Budampati ............. G06F 3/023 340/679 |
| 2011/0252845 A1 | 10/2011 | Webb et al. |
| 2011/0257973 A1* | 10/2011 | Chutorash .......... G01C 21/3661 704/235 |
| 2011/0313937 A1 | 12/2011 | Moore, Jr. et al. |
| 2012/0119524 A1 | 5/2012 | Bingle et al. |
| 2012/0154292 A1 | 6/2012 | Zhao et al. |
| 2012/0180394 A1 | 7/2012 | Shinohara |
| 2012/0205925 A1 | 8/2012 | Muller et al. |
| 2012/0228886 A1 | 9/2012 | Muller et al. |
| 2012/0232749 A1* | 9/2012 | Schoenberg ........... B60N 2/002 701/36 |
| 2012/0252402 A1 | 10/2012 | Jung |
| 2013/0049403 A1 | 2/2013 | Fannon et al. |
| 2013/0069761 A1 | 3/2013 | Tieman |
| 2013/0079984 A1 | 3/2013 | Aerts et al. |
| 2013/0104459 A1 | 5/2013 | Patel et al. |
| 2013/0127180 A1 | 5/2013 | Heberer et al. |
| 2013/0138303 A1 | 5/2013 | McKee et al. |
| 2013/0207794 A1* | 8/2013 | Patel ...................... B60K 35/00 340/425.5 |
| 2013/0282226 A1* | 10/2013 | Pollmann ................ B60Q 1/50 701/29.1 |
| 2013/0295913 A1 | 11/2013 | Matthews, III et al. |
| 2013/0311046 A1 | 11/2013 | Heberer et al. |
| 2013/0321065 A1 | 12/2013 | Salter et al. |
| 2013/0325521 A1 | 12/2013 | Jameel |
| 2014/0000165 A1 | 1/2014 | Patel et al. |
| 2014/0007404 A1 | 1/2014 | Krishnan et al. |
| 2014/0015637 A1 | 1/2014 | Dassanakake et al. |
| 2014/0057610 A1* | 2/2014 | Olincy .................... H04W 4/16 455/414.1 |
| 2014/0088825 A1 | 3/2014 | Lange et al. |
| 2014/0129113 A1 | 5/2014 | Van Wiemeersch et al. |
| 2014/0150581 A1 | 6/2014 | Scheuring et al. |
| 2014/0156111 A1 | 6/2014 | Ehrman |
| 2014/0188999 A1 | 7/2014 | Leonard et al. |
| 2014/0200774 A1 | 7/2014 | Lange et al. |
| 2014/0227980 A1 | 8/2014 | Esselink et al. |
| 2014/0242971 A1 | 8/2014 | Aladenize et al. |
| 2014/0245666 A1 | 9/2014 | Ishida et al. |
| 2014/0256304 A1 | 9/2014 | Frye et al. |
| 2014/0278599 A1 | 9/2014 | Reh |
| 2014/0293753 A1 | 10/2014 | Pearson |
| 2014/0338409 A1 | 11/2014 | Kraus et al. |
| 2014/0347163 A1 | 11/2014 | Banter et al. |
| 2015/0001926 A1 | 1/2015 | Kageyama et al. |
| 2015/0048927 A1 | 2/2015 | Simmons |
| 2015/0059250 A1 | 3/2015 | Miu et al. |
| 2015/0084739 A1 | 3/2015 | Lemoult et al. |
| 2015/0149042 A1 | 5/2015 | Cooper et al. |
| 2015/0161832 A1 | 6/2015 | Esselink et al. |
| 2015/0197205 A1* | 7/2015 | Xiong ................... B60R 16/037 701/49 |
| 2015/0240548 A1 | 8/2015 | Bendel et al. |
| 2015/0294518 A1 | 10/2015 | Peplin |
| 2015/0330112 A1 | 11/2015 | Van Wiemeersch et al. |
| 2015/0330113 A1 | 11/2015 | Van Wiemeersch et al. |
| 2015/0330114 A1 | 11/2015 | Linden et al. |
| 2015/0330117 A1 | 11/2015 | Van Wiemeersch et al. |
| 2015/0360545 A1 | 12/2015 | Nanla |
| 2015/0371031 A1 | 12/2015 | Ueno et al. |
| 2016/0060909 A1 | 3/2016 | Krishnan et al. |
| 2016/0130843 A1* | 5/2016 | Bingle ................ E05B 47/0009 292/242 |
| 2016/0138306 A1 | 5/2016 | Krishnan et al. |
| 2016/0153216 A1 | 6/2016 | Funahashi et al. |
| 2016/0249191 A1* | 8/2016 | Avrahami ............... H04L 67/12 |
| 2016/0326779 A1 | 11/2016 | Papanikolaou et al. |
| 2017/0014039 A1 | 1/2017 | Pahlevan et al. |
| 2017/0074006 A1 | 3/2017 | Patel et al. |
| 2017/0247016 A1 | 8/2017 | Krishnan |
| 2017/0270490 A1 | 9/2017 | Penilla et al. |
| 2017/0306662 A1 | 10/2017 | Och et al. |
| 2017/0349146 A1 | 12/2017 | Krishnan |
| 2018/0038147 A1 | 2/2018 | Linden et al. |
| 2018/0051493 A1 | 2/2018 | Krishnan et al. |
| 2018/0051498 A1 | 2/2018 | Van Wiemeersch et al. |
| 2018/0058128 A1 | 3/2018 | Khan et al. |
| 2018/0065598 A1 | 3/2018 | Krishnan |
| 2018/0080270 A1 | 3/2018 | Khan et al. |
| 2018/0128022 A1 | 5/2018 | Van Wiemeersch et al. |

FOREIGN PATENT DOCUMENTS

| | | |
|---|---|---|
| CN | 201280857 | 7/2009 |
| CN | 101527061 A | 9/2009 |
| CN | 201567872 U | 9/2010 |
| CN | 101932466 A | 12/2010 |
| CN | 201915717 U | 8/2011 |
| CN | 202200933 U | 4/2012 |
| CN | 202686247 U | 1/2013 |
| CN | 103206117 A | 7/2013 |
| CN | 103264667 A | 8/2013 |
| CN | 203511548 U | 4/2014 |
| CN | 204326814 U | 5/2015 |
| DE | 4403655 A1 | 8/1995 |
| DE | 19620059 A1 | 11/1997 |
| DE | 19642698 A2 | 11/2000 |
| DE | 19642698 C2 | 11/2000 |
| DE | 10212794 A1 | 6/2003 |
| DE | 20121915 U1 | 11/2003 |
| DE | 10309821 A1 | 9/2004 |
| DE | 102005041551 A1 | 3/2007 |
| DE | 102006029774 A1 | 1/2008 |
| DE | 102006041926 A1 | 3/2008 |
| DE | 102010052582 A1 | 5/2012 |

(56) References Cited

FOREIGN PATENT DOCUMENTS

| | | | |
|---|---|---|---|
| DE | 102011051165 A1 | 12/2012 | |
| DE | 102015101164 A1 | 7/2015 | |
| DE | 102014107809 A1 | 12/2015 | |
| EP | 0372791 A2 | 6/1990 | |
| EP | 0694664 A1 | 1/1996 | |
| EP | 1162332 A1 | 12/2001 | |
| EP | 1284334 A1 | 2/2003 | |
| EP | 1288403 A2 * | 3/2003 | ............. E05B 41/00 |
| EP | 1284334 A1 | 9/2003 | |
| EP | 1460204 A2 | 9/2004 | |
| EP | 1465119 A1 | 10/2004 | |
| EP | 1338731 A3 | 2/2005 | |
| EP | 1944436 A2 | 7/2008 | |
| EP | 2053744 A2 | 4/2009 | |
| EP | 2314803 A2 | 4/2011 | |
| FR | 2698838 A1 | 6/1994 | |
| FR | 2783547 A1 * | 3/2000 | ............. B60Q 1/323 |
| FR | 2841285 A1 | 12/2003 | |
| FR | 2948402 A1 | 7/2009 | |
| FR | 2955604 A1 | 7/2011 | |
| GB | 2402840 A | 12/2004 | |
| GB | 2496754 A | 5/2013 | |
| JP | 62255256 A | 11/1987 | |
| JP | 05059855 A | 3/1993 | |
| JP | 06167156 A | 6/1994 | |
| JP | 406185250 A | 7/1994 | |
| JP | 2000064685 A | 2/2000 | |
| JP | 2000314258 A * | 11/2000 | |
| JP | 2007138500 A | 6/2007 | |
| KR | 20030025738 A | 3/2003 | |
| KR | 20120108580 A | 10/2012 | |
| WO | 0123695 A1 | 4/2001 | |
| WO | 03095776 A1 | 11/2003 | |
| WO | 2013111615 A1 | 8/2013 | |
| WO | 2013146918 A1 | 10/2013 | |
| WO | 2014146186 A1 | 9/2014 | |

OTHER PUBLICATIONS

U.S. Appl. No. 14/280,035, filed May 16, 2014, entitled "Powered Latch System for Vehicle Doors and Control System Therefor."

U.S. Appl. No. 14/281,998, filed May 20, 2014, entitled "Vehicle Door Handle and Powered Latch System."

U.S. Appl. No. 14/282,224, filed May 20, 2014, entitled "Powered Vehicle Door Latch and Exterior Handle With Sensor."

Department of Transportation, "Federal Motor Vehicle Safety Standards; Door Locks and Door Retention Components and Side Impact Protection," http://www.nhtsa.gov/cars/rules/rulings/DoorLocks/DoorLocks_NPRM.html#VI_C, 23 pages, Aug. 28, 2010.

Zipcar.com, "Car Sharing from Zipcar: How Does car Sharing Work?" Feb. 9, 2016, 6 pages.

General Motors Corporation, 2006 Chevrolet Corvette Owner Manual, © 2005 General Motors Corporation, 4 pages.

General Motors LLC, 2013 Chevrolet Corvette Owner Manual, 2012, 17 pages.

General Motors, "Getting to Know Your 2014 Corvette," Quick Reference Guide, 2013, 16 pages.

InterRegs Ltd., Federal Motor Vehicle Safety Standard, "Door Locks and Door Retention Components," 2012, F.R. vol. 36 No. 232—Feb. 12, 1971, 23 pages.

Ross Downing, "How to Enter & Exit a Corvette With a Dead Battery," YouTube video http://www.youtube.com/watch?v=DLDqmGQU6L0, Jun. 6, 2011, 1 page.

Jeff Glucker, "Friends videotape man 'trapped' inside C6 Corette with dead battery," YouTube via Corvett Online video http://www.autoblog.com/2011/05/14/friends-videotape-man-trapped-inside-c6-corvette-with-dead-bat/, May 14, 2011, 1 page.

Don Roy, "ZR1 Owner Calls 911 After Locking Self in Car," website http://www.corvetteonline.com/news/zr1-owner-calls-911-after-locking-self-in-car/, Apr. 13, 2011, 2 pages.

Zach Bowman, "Corvette with dead battery traps would-be thief," website http://www.autoblog.com/2011/10/25/corvette-with-dead-battery-traps-would-be-thief/, Oct. 25, 2011, 2 pages.

U.S. Appl. No. 14/468,634, filed Aug. 26, 2014, 15 pages.

U.S. Appl. No. 13/608,303, filed Sep. 10, 2012, 15 pages.

"Push Button to open your car door" Online video clip. YouTube, Mar. 10, 2010. 1 page.

Car of the Week: 1947 Lincoln convertible by: bearnest May 29, 2012 http://www.oldcarsweekly.com/car-of-the-week/car-of-the-week-1947-lincoln-convertible. 7 pages.

U.S. Appl. No. 14/276,415, filed May 13, 2014, 18 pages.

Office Action dated Mar. 10, 2017, U.S. Appl. No. 15/174,206, filed Jun. 6, 2016, 17 pages.

Hyundai Bluelink, "Send Directions to your car," Link to App, 2015, 3 pages.

Bryan Laviolette, "GM's New App Turns Smartphones into Virtual Keys," Article, Jul. 22, 2010, 2 pages.

U.S. Appl. No. 12/402,744, Office Action dated Oct. 23, 2013, 7 pages.

U.S. Appl. No. 12/402,744, Advisory Action dated Jan. 31, 2014, 2 pages.

George Kennedy, "Keyfree app replaces conventional keys with your smart phone," website, Jan. 5, 2015, 2 pages.

Hyundai Motor India Limited, "Hyundai Care," website, Dec. 8, 2015, 3 pages.

Keyfree Technologies Inc., "Keyfree," website, Jan. 10, 2014, 2 pages.

PRWEB, "Keyfree Technologies Inc. Launches the First Digital Car Key," Jan. 9, 2014, 3 pages.

* cited by examiner

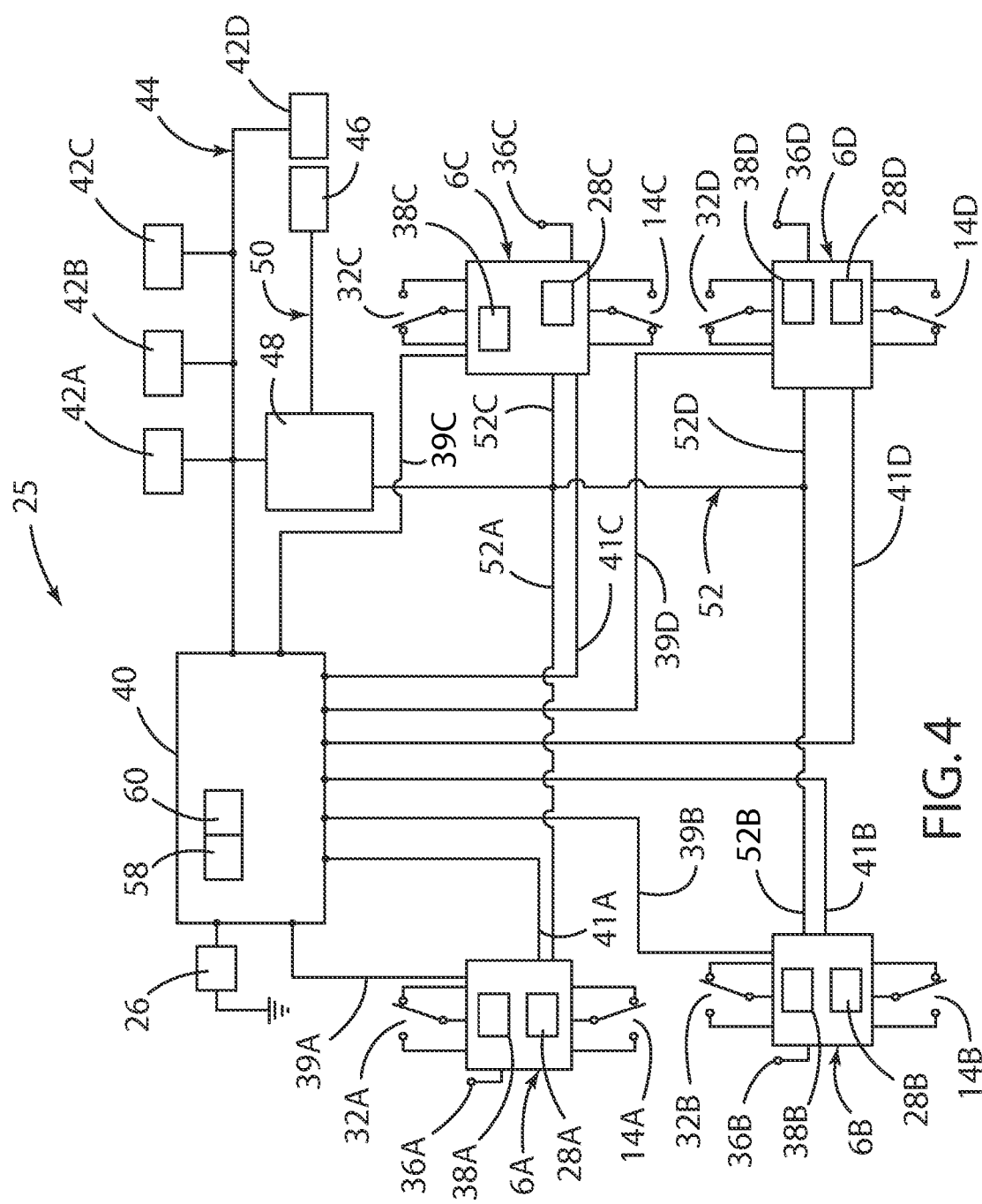

US 10,273,725 B2

CUSTOMER COACHING METHOD FOR LOCATION OF E-LATCH BACKUP HANDLES

FIELD OF THE INVENTION

The present invention generally relates to doors for motor vehicles, and more particularly, to a powered latch system and display that provides a user with information concerning the location of a backup mechanical latch release that may be utilized if a vehicle's electrical power supply to the powered latch controller has been interrupted.

BACKGROUND OF THE INVENTION

Electrically powered latches ("E-latches") have been developed for motor vehicle doors. Powered door latches may be unlatched by actuating an electrical "unlatch" switch. Actuation of the switch causes an electric motor to shift a pawl to a released/unlatched position that allows a claw of the latch to move and disengage from a striker to permit opening of the vehicle door. E-latches may include an emergency or backup release lever that is mechanically connected to the latch mechanism. The release lever can be manually actuated from inside the vehicle to unlatch the powered latch in the event the powered latch fails due to a local loss of electrical power to the powered latch controller of the door or other malfunctions in the electronics or software of the powered latch controller for the door with the mechanical release lever.

SUMMARY OF THE INVENTION

One aspect of the present invention is a powered door latch system for vehicles including a controller configured to receive data concerning vehicle operating conditions/parameters. The door latch system also includes at least one electrically powered door latch having a powered actuator that can be actuated by the controller to unlatch the electrically powered latch. At least one manually-operable emergency release is mechanically connected to at least one electrically powered latch to mechanically release the latch. The emergency release may comprise a lever or other suitable mechanical device. The system also includes a user communication device such as a display screen and/or audio device (e.g. a speaker) that is operably connected to the controller. The controller causes the user communication device to provide a user with information concerning the location and/or operation of the emergency release if the controller determines that at least one predefined operating condition such as a loss of electrical power has occurred.

Another aspect of the present invention is a method of providing a user of a vehicle having a powered door latch with information concerning an emergency release that is configured to mechanically unlatch the powered door latch in the event of electrical power loss to the powered latch. The method includes determining if a predefined malfunction preventing powered unlatching of the powered door latch has occurred. The method also includes causing a communication device such as a screen inside the vehicle to display/provide information concerning the location of the emergency release if a predefined malfunction has occurred in at least one door with a mechanical release lever.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a diagram showing the architecture of a powered door latch system of a motor vehicle.

DETAILED DESCRIPTION OF THE PREFERRED EMBODIMENTS

Figure 1:
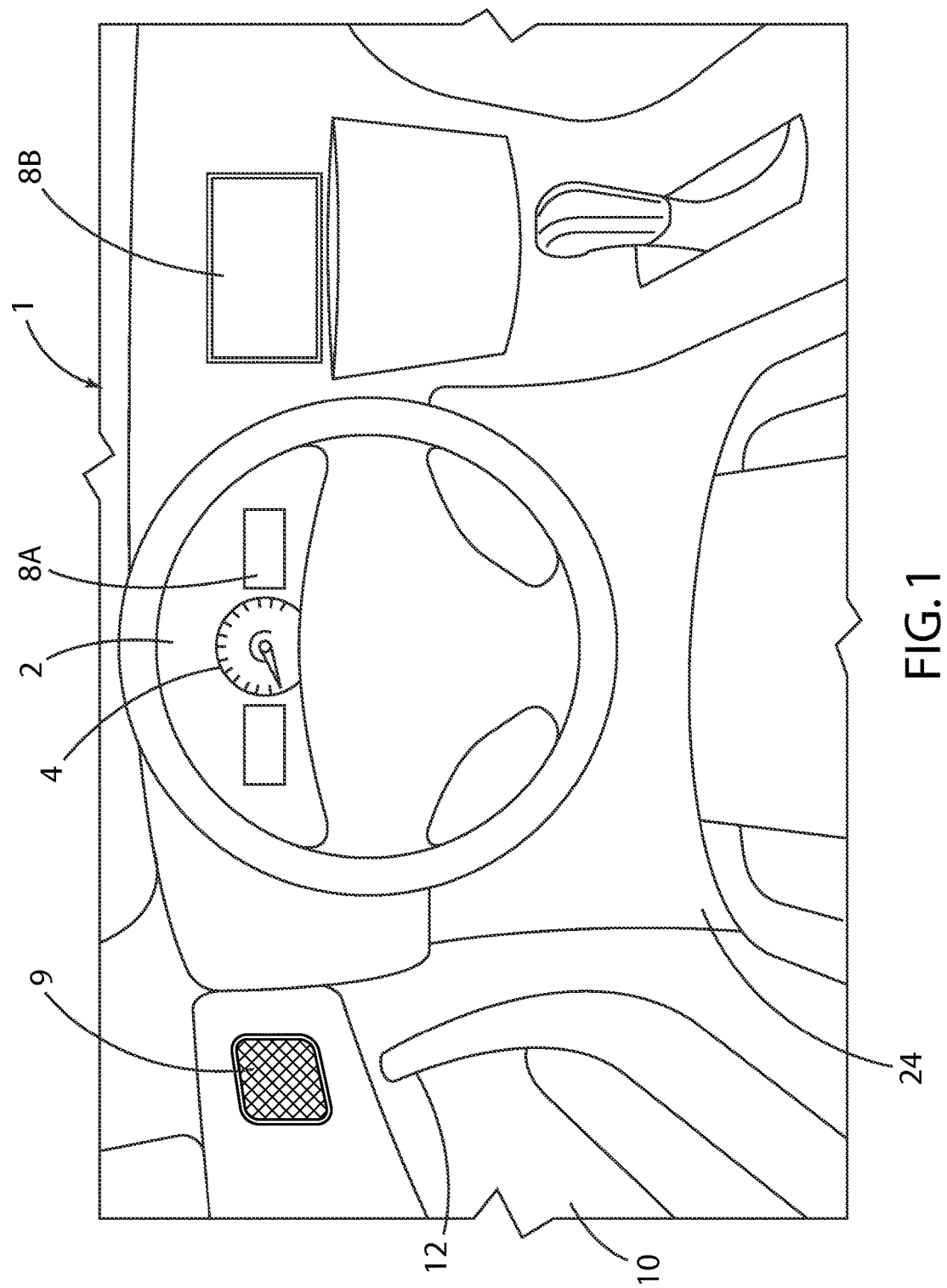
FIG. 1 is a partially fragmentary isometric view of a portion of a vehicle interior including a dashboard and display screen.
Figure 2:
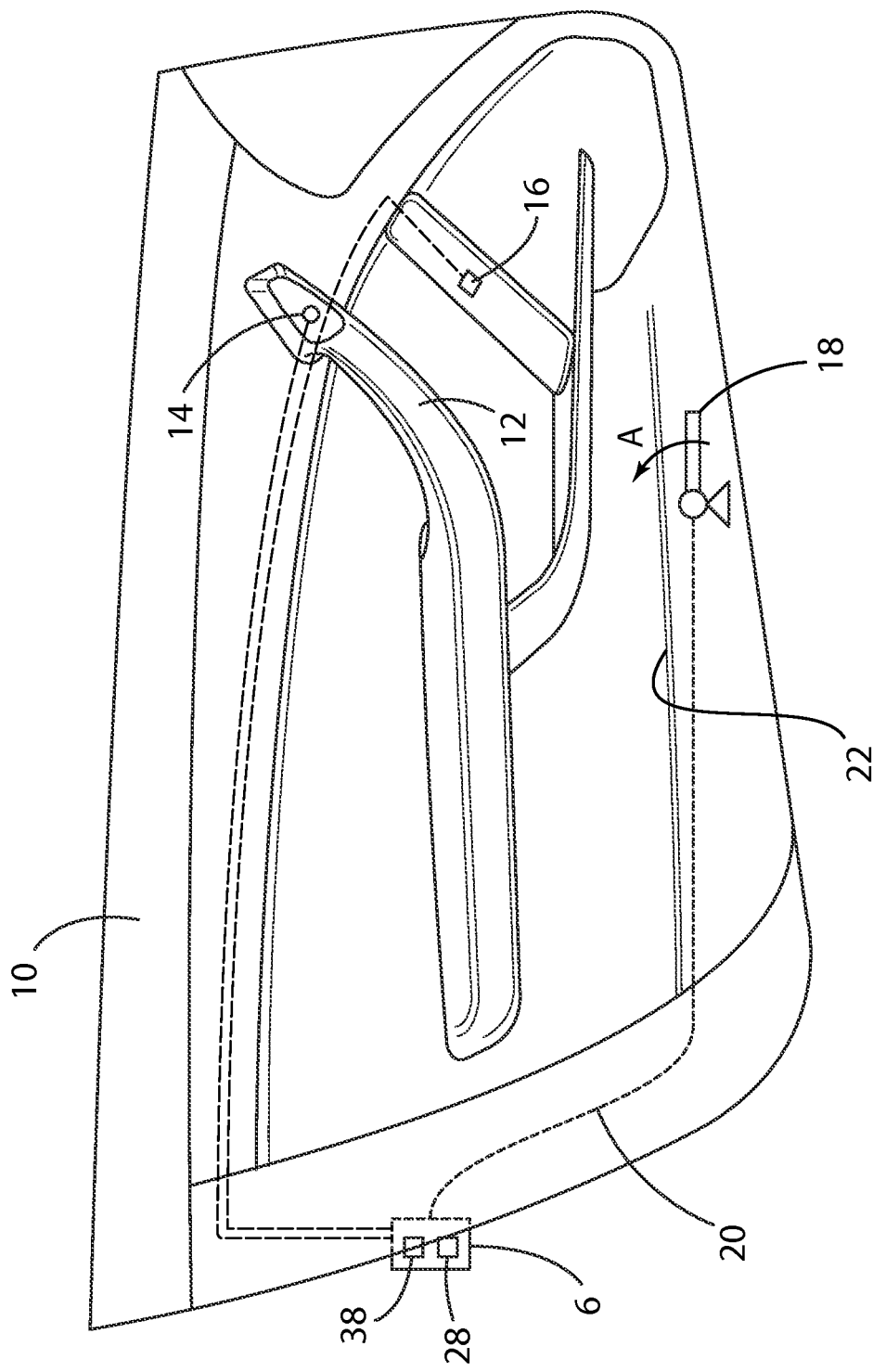
FIG. 2 is an isometric view of a vehicle door.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a vehicle 1 includes a dashboard 2 having one or more instruments 4. The vehicle 1 also includes one or more display screens 8A and 8B that can be utilized to provide visual information concerning vehicle operation to a user. Display screens 8A and 8B may comprise LCD screens, LED screens, OLED screens, or other suitable display capable of providing text and/or moving or still images. The vehicle 1 may also include one or more speakers 9 or other audio devices that generate audio signals (e.g. voice messages) to provide a user with information concerning operation of the vehicle. Specifically, voice messages can be supplied to a user of the vehicle utilizing a speaker.

Vehicle 1 also includes one or more doors 10 that are movably mounted to the vehicle structure utilizing hinges or other suitable mechanism. With further reference to FIG. 2, the vehicle door 10 may include an interior handle 12 and an unlatch switch that can be actuated by a user to unlatch a powered latch 6. As discussed in more detail below, actuation of switch 14 generates an unlatch request that is processed by a latch controller to determine if powered latch 6 is to be unlatched. The door 10 may also include an unlock button 16 that can be utilized to unlock the powered door latch 6. As discussed in more detail below, powered latch 6 may include a backup power supply 28 and a controller 38. An emergency or backup such as a lever 18 or other suitable device is mechanically connected to the powered latch 6 by a cable 20, mechanical linkage, or the like. The emergency release lever 18 may be mounted to the vehicle door 10 in a pocket 22 as shown in FIG. 2. Alternatively, the emergency release lever 18 may be mounted on the interior face of the door or on the top of the door sill of vehicle 1, or other suitable location. Because switches 14 and 16 can normally be utilized to unlatch powered latch 6, emergency release lever 18 is typically used infrequently. Thus, emergency release lever 18 may be mounted in a location that is remote from handle 12 and/or switches 12 and 14. Also, emergency release lever 18 may be mounted in a "hidden" location (e.g. pocket 22) such that emergency release lever 18 is not readily visible to a vehicle operator/occupant. Even if the emergency release lever 18 is in plain sight, the function of the emergency release lever 18 may not be readily apparent to a user.

Figure 3:
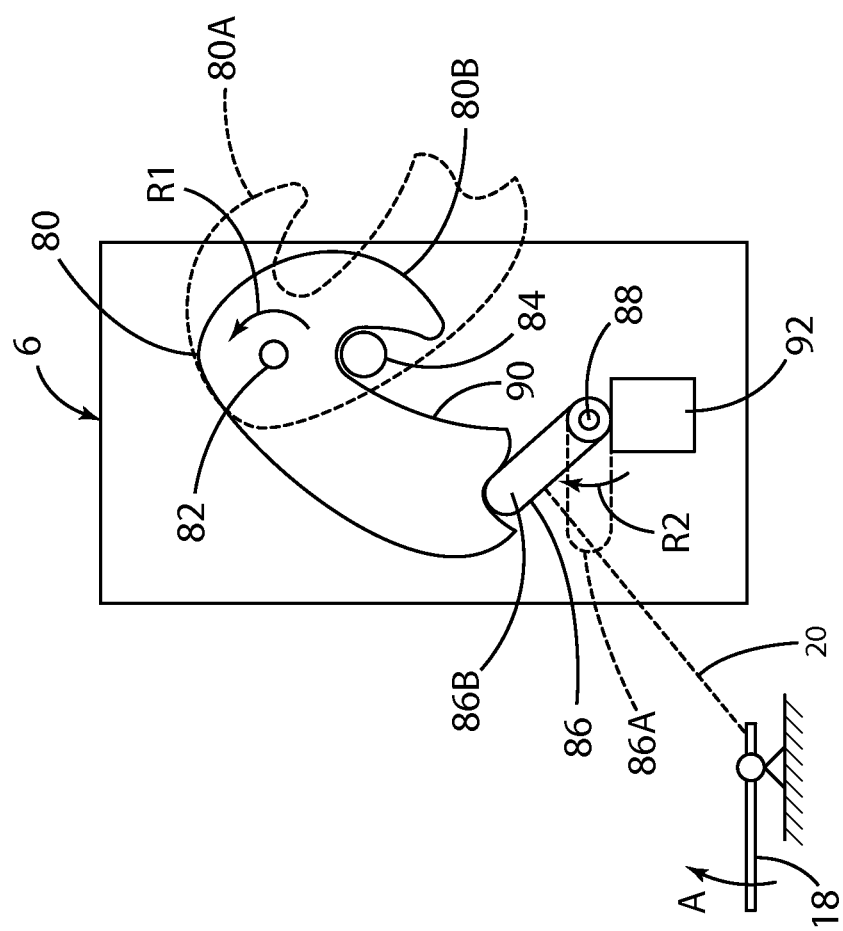
FIG. 3 is a schematic view of a powered door latch.

With further reference to FIG. 3, powered latch 6 may include a claw 80 that pivots about a pin 82 and a spring-biased pawl 86 that rotates about pin 88. Claw 80 is spring-biased towards an extended position 80A. In use, when door 10 is open, claw 80 will normally be in the extended position 80A due to the spring bias. As the door 10 is closed, surface 90 of claw 80 comes into contact with a striker 84 that is mounted to the vehicle structure. Contact between striker 84 and surface 90 of claw 80 causes the claw 80 to rotate about pin 82 in the direction of the arrow "R1" until the claw 80 reaches the closed position 80B. A pawl 86 is rotatably mounted for rotation about a pin 88. Pawl 86 can move between a disengaged or unlatched position 86A and a latched or engaged configuration or position 86B. When claw 80 is in the closed position 80B, and pawl 86 is in the engaged position 86B, pawl 86 prevents rotation of claw 80 to the open position 80A, thereby preventing opening of door 10. Claw 80 may be biased by a spring or the like for rotation in a direction opposite the arrow R1 such that the claw 80 rotates to the open position 80A unless pawl 86 is in the engaged position 86B. Pawl 86 may be biased by a spring or the like in the direction of the arrow R2 such that pawl 86 rotates to the engaged position 86B as claw 80 rotates to the closed position 80B as striker 84 engages claw 80 as door 10 is closed. Latch 6 can be unlatched by rotating pawl 86 in a direction opposite the arrow R2 to thereby permit rotation of claw 80 from the closed position 80B to the open position 80A. A powered actuator such as an electric motor 92 may be operably connected to the pawl 86 to thereby rotate the pawl 86 to the disengaged or unlatched position 86A. Latch 6 may include a controller (38A-38D, FIG. 4) that can be configured to cause powered latch 6 to shift from a latched configuration or state to an unlatched configuration or state by causing powered actuator 92 to rotate pawl 86 from the latched or engaged position 86B to the unlatched configuration or position 86A. It will be understood that various types of powered latches may be utilized in the present invention, and the powered latch 6 need not include the claw 80 and powered pawl 86 as shown in FIG. 3. For example, powered actuator 92 could be operably interconnected with the claw 80 utilizing a mechanical device other than pawl 86 to thereby shift the powered latch 6 between latched and unlatched states. Also, the mounting locations of powered latch 6 and striker 84 may be reversed. Specifically, latch 6 may be mounted to a vehicle structure, and striker 84 may be mounted to the vehicle door 10. In general, vehicle door 10 can be opened if powered latch 6 is in an unlatched state, but the powered latch 6 retains the vehicle door 10 in a closed position when the powered latch 6 is in a latched state or configuration.

Emergency release lever 18 may be operably connected to the pawl 86 such that rotation/movement of lever 18 as indicated by the arrow "A" causes pawl 86 to move to the unlatched or disengaged position 86A. It will be understood that emergency release 18 may comprise virtually any release member that is capable of unlatching powered latch 6, and the present invention is not limited to a specific lever or other device.

With further reference to FIG. 4, powered latch system 25 includes a left front powered latch 6A, a left rear powered latch 6B, a right front powered latch 6C and a rear powered latch 6D. The powered latches 6A-6D selectively retain left front, left rear, right front, and right rear doors, respectively, in closed positions. One or more of the powered latches 6A-6D may be operably connected to emergency releases 18 whereby the powered latches 6A-6D can be mechanically released if a malfunction preventing powered unlatching of one or more of latches 6A-6D occurs. For example, emergency release(s) 18 may be utilized in the event a main vehicle power supply (e.g. battery 26) of the vehicle 1 is lost. The powered latches 6A-6D may optionally include backup power supplies 28A-28D, respectively. The backup power supplies 28A-28D may comprise capacitors, batteries, or other suitable electrical devices capable of storing sufficient electrical power to actuate the powered actuator 92 (FIG. 3) in the event electrical power from the main battery 26 is interrupted or lost. It will be understood that the latch system 25 may include a single powered latch 6A, a pair of powered latches 6A and 6C, four powered latches 6A-6D, or other combinations or configurations of powered latches as required for a particular vehicle. Also, powered latches 6A-6D may also be utilized to retain liftgates, sliding doors, or other movable panels or structures.

Powered latches 6A-6D are operably connected to exterior unlatch switches 32A-32D and interior unlatch switches 14A-14D, respectively. In general, actuation of switches 32A-32D or 14A-14D will cause latches 6A-6D to unlatch if the main power supply 26 is available, or if the back-up power supplies 28A-28D in a door is available, and if the system 25 determines that unlatching is proper according to various vehicle operating perimeters. Powered latches 6A-6D may include controllers 38A-38D, respectively. Controllers 38A-38D of powered latches 6A-6D may be configured (e.g. programmed) to individually control the powered actuators/electrical motors 92 of each powered latch 6A-6D utilizing inputs/data received from switches 32A-32D, switches 14A-14D, and the other modules of system 25. Each of the powered latches 6A-6D may include an electrical connection 36A-36D that operably connects the powered latches 6A-6D with the main vehicle power supply 26. As discussed in more detail below, the controllers 38A-38D may be operably connected to a body control module 40 and/or other components by a data network and/or electrical conductors that "hard wire" the components together.

Body control module 40 may be operably interconnected to an instrument panel cluster 42A, a restraints control module ("RCM") that determines if a crash has occurred, and a powertrain control module ("PCM") 42 by a network data connection line 44. A center stack display 42D is also operably connected to the body control module 40 by data/network 44. Network 44 may comprise a first High Speed Controller Area Network ("HS1-CAN") that operates according to known industry standards. The instrument panel 42A may include one or more display screens 8A (FIG. 1), and the center stack display 42D may include one or more display screens 8B (FIG. 1). A vehicle speed sensor 46 (e.g. an ABS speed sensor) is operably connected to a data link controller 48 by a network 50. Network 50 may comprise a second High Speed Controller Area Network ("HS2-CAN") that operates according to known industry standards. A digital logic controller gateway 48 is operably connected to powered latches 6A-6D by a network backbone 52 that includes stubs 52A-52D. Network 52 may comprise a Medium Speed Controller Area Network ("MS-CAN") that operates according to known industry standards. Powered latches 6A-6D are also operably connected to body control module 40 by data lines 39A-39D, respectively. Data lines 39A-39D may be utilized to transmit data from controllers 38A-38D to the body control module 40 and visa-versa.

Powered latches 6A-6D may also be directly connected ("hard wired") to body control module 40 by conductor/wires 41A-41D that provide data (door ajar status) to body control module 40.

As discussed above, the powered latches 6A-6D include emergency or backup power supplies 28A-28D, respectively. In the event main power supply 26 is interrupted, the controllers 38A-38D may be configured to cause the powered latches 6A-6D to go into a reserve power mode in which the latches 6A-6D utilize the backup power supplies 28A-28D.

Controllers 38A-38D of powered latches 6A-6D may be configured to send periodic "heartbeat" signals to body control module 40 and/or other modules/components of system 25. If the "heartbeat" signal is not received by body control module 40, this generally indicates that a malfunction/loss of operation or communication has occurred. In use, if one or more of the powered latches 6A-6D go into the reserve power mode, the corresponding controller(s) may be configured to stop sending the "heartbeat" signal to conserve energy. The body control module 40 will then detect that one or more of the latch controllers 38A-38D are off-line (i.e. not communicating with body control module 40). If the off-line condition persists for a predefined time period (e.g. 5 minutes) or a predefined number of key cycles (Key ON/Key OFF), the body control module 40 may be configured to cause one or more of the display screens 8A and/or 8B to provide a "seek service" display to a user immediately following "Key ON" or "Key OFF" events. This display (or audio signal) prompts a user to seek service for the door/powered latch or latches 6A-6D that are off-line. It will be understood that the "seek service" display and/or audio/voice signal could comprise a variety of messages, images, sounds, etc. and the "seek service" display/signal would not necessarily have to include the term "seek service." On vehicles that do not have an emergency mechanical release lever 18 on each of the doors with a powered latch 6, failure to seek service soon may result in a power reserve in a latch controller 38A-38D slowly depleting over a period of time (e.g. a few days or a week) resulting in the inability to open those doors not possessing the back-up release lever 18. For such situations, if the door cannot be opened to remove the trim screws to gain service access to the door interior power latching system, then such a condition will require extraordinary effort to service the power latching system.

Also, when body control module 40 determines that the "seek service" warning/prompt should be made, the display 8A and/or display 8B may provide text or other visual material (graphics/images) explaining the location of backup release lever 18 and/or operation of lever 18. The displays 8A and/or 8B may also provide information concerning operation of the backup release lever 18 and/or other information concerning the failure of one or more of the powered latches 6A-6D. In addition to the visual information, audio information may also be provided utilizing one or more speakers 9 (FIG. 1). For example, an audio message "The driver's side powered door latch is presently inoperative. Please pull the emergency release lever located inside the pocket below the driver's side door handle" or other appropriate audio could be provided such as a recommendation to seek service within a specified number of days otherwise the door will remain closed. Also, the location and/or operation of the backup handle 18 could be conveyed utilizing display screens 8A and/or 8B and/or an audio (voice) message during the first 100 odometer miles (or other distance) to educate new owners of a vehicle.

The powered latches 6A-6D may, optionally, not include backup power supplies 28A-28D, such that the powered latches 6A-6D rely solely on the main battery/power supply 26. If the system 25 is configured in this way, body control module 40 may be configured to cause the displays 8A and 8B to display a message or provide other information concerning the location and/or operation of emergency release lever 18 if a low state of battery charge is detected and/or if other operating conditions indicate that a power failure is likely.

The body control module 40 may be configured to detect when one or more of the vehicle doors are ajar. If a door is ajar even though the body control module 40 did not actuate the corresponding powered latch 6A-6D, this may indicate that emergency release lever 18 was utilized to open the door. If the body control module 40 detects a plurality of door ajar conditions that do not follow powered actuation of the powered latches 6A-6D, controller 40 may be configured to display "seek service" messages/images/signals utilizing display 8A and/or 8B. Also, during normal operation, actuation of exterior and interior release switches will occur in an alternating manner as users release latches 6A-6D to enter and exit the vehicle. If module 40 detects that an exterior release switch 32A-32D or a corresponding interior release switch 14A-14D has been activated, but also detects that never both the exterior switch 32A-32D and corresponding interior release switch 14A-14D has also being activated, controller 40 may be configured to display a "seek service" prompt (e.g. at Key ON and Key OFF) until a normal (alternating) pattern of interior and exterior switch activations is detected.

Furthermore, the controller 40 may be configured to display graphic image or text instructions explaining the location and/or operation of the emergency release lever 18 on the driver's door if the controller 40 determines that several drive cycles (Key ON and Key OFF) have occurred with no driver door opening, but with a front or rear passenger opening each of the same drive cycles. Furthermore, controller 40 could be configured to provide a graphic image or text instructions explaining the location/operation of the emergency release lever 18 if the controller 40 determines that ajar events on a specific door have occurred in the absence of interior handle release triggers (i.e. actuations of interior unlatch switches 14A-14D) and no associated preceding exterior handle events (e.g. actuation of exterior unlatch switches 32A-32D).

According to another aspect of the present invention, the rear doors of the vehicle could have a childproof mechanical back-up handle 18 packaged in a location on the door that is difficult for a child to release but relatively easy for an adult to release if information concerning the emergency release is provided. Accordingly, the controller 40 may be configured to provide information (e.g. text instructions and/or images) concerning the location and/or operation of childproof emergency release levers located on or adjacent the rear doors of a vehicle.

According to another aspect of the present invention the rear doors of a vehicle could include a mechanical emergency release lever 18 that is in a location that is readily accessible, but wherein the emergency release lever is covered or blocked by a childproof cover requiring specific release movements or operations. Controller 40 may be configured to provide specific information (e.g. text instructions and/or images) concerning the location and/or removal of a childproof cover that selectively prevents access to an emergency release lever 18 for rear doors of a motor vehicle.

The system 25 may also be configured to utilize passive key fobs that are identified by the body control module 40. If the body control module 40 detects that an infrequently used passive key fob was used to start the vehicle, the controller 40 may be configured to provide information (e.g. text instructions and/or images) concerning the location and/or operation of the emergency release lever 18 utilizing the display screens 8A and/or 8B. Further, the new driver educating routine could be repeated for other events which may suggest a new driver such as a new phone being paired with the vehicle, or a known phone being absent during a drive cycle.

The system 25 (e.g. latch controllers 38A-38D) may be configured to require a sequence of actuations of interior unlatch switches 14A-14D in order to actuate (unlatch) the powered latches 6A-6D, respectively, to permit exit of the vehicle. For example, controllers 38A-38D may be configured to require that each interior unlatch switch 14A-14D is actuated twice within 3 seconds to unlatch the powered latches 6A-6D. A requirement for multiple switch actuations may be utilized to prevent inadvertent unlatching of the powered latches 6A-6D. Also, a multi-action switch actuation requirement may be utilized in situations where the controllers 38A-38D of the powered latches 6A-6D lose connection with the body control module 40 and/or other system components such that vehicle speed information is not available during Key ON. During normal "Key ON" operation, restraints control module 42B generates periodic signals that are received by other components of the system 25. If an expected signal from the restraints control module 42B is not received by the controllers 38A-38D during Key ON, controller 38A-38D may be configured to require multiple actuations of switches 14A-14D. Also, if the controllers 38A-38D of powered latches 6A-6D do not send the expected "heartbeat" signal to the body control module 40 when the Key ON condition occurs, this may indicate that controllers 38A-38D have shifted to backup power supplies 28A-28D, and also shifted to a mode requiring multiple actuations of interior switches 14A-14D. If a condition occurs indicating that controllers 38A-38D have likely shifted to a multi actuation mode, controller 40 may be configured to provide information concerning multi-actuation of interior unlatch switches 14A-14D utilizing display screens 8A and/or 8B. Thus, in the event a specified failure has occurred, a user will be provided with information/instructions concerning the multiple interior switch activation procedure.

Vehicle 1 may also be configured such that the rear doors do not include emergency release levers 18. When the vehicle is configured in this way, the controllers 38A-38D of powered door latches 6A-6D may be configured to require multiple switch actuations of interior switches 14A-14D. The child lock status of the system may be determined/stored by body control module 40 or other system components other than latch controllers 38A-38D. Thus, if a loss of data connectivity occurs, the rear door latches 6B and 6D may not retain the child lock status from the interior. The controllers 38B and 38D may be configured to unlatch the rear powered latches 6B and 6D only if interior unlatch switches 34B, 34D are actuated multiple times within a predefined time interval (e.g. 3 seconds). If the child lock feature has been activated for the rear doors, the latches 6B and 6D of the rear doors will unlatch if a predefined multi-action interior unlatch switch activation sequence is performed. If the child lock feature for the rear doors is not active (e.g. due to a loss of data communication), controller 40 may be configured to provide information to a user utilizing screens 8A and/or 8B indicating that the child lock feature for the rear doors is not active, and providing information concerning any required interior unlatch switch sequences that may be required to unlatch rear latches 6B and 6D. Vehicle 1 may include a driver door switch panel (e.g. window lock-out) enabling a driver to select child lock mode. If child lock mode has been selected utilizing the driver door switch panel, but a loss of data connectivity has occurred, controller 40 may be configured to display a "no child lock" message at every Key-ON cycle until the data connectivity or loss of power situation is resolved.

Also, when one or more of the powered latches 6A-6D go into a back-up power mode, the controller 40 may be configured to require that the exterior handle switches 32A-32D be closed for a predefined period of time (e.g. 3 seconds) in order to latch and/or unlatch the powered latches 6A-6D. Controller 40 may be configured to utilize displays 8A and/or 8B to provide a user with information concerning how to secure/latch the door from the outside by holding the exterior switches 32A-32D for a minimum of 3 seconds (or other predefined time interval).

Vehicle 1 may also include a transmitter 58 and backup power supply 60. The transmitter 58 may be configured to communicate with a portable cell phone or other such wireless device. The system 25 may be configured to send information (e.g. a text message) to a user's cell phone to cause the cell phone to provide/display information concerning the location and/or operation of the emergency release lever 18. Similarly, the system 25 may be configured to send information (e.g. a text message) to a user's cell phone when multiple actuations of interior switches 14A-14D are required to unlatch the powered latches 6A-6D, and when the rear child lock status or feature is not fully active. Furthermore, the system 25 may be configured to utilize the backup power supply 60 to send a text message to a user's cell phone concerning the location and/or operation of the emergency release lever 18 and/or if a multiple actuation of interior unlatch switches 14A-14D is required for exiting the vehicle, and/or if the child lock feature is not fully available for the rear seats.

Furthermore, the system 25 may include a voice command system that provides a voice message to alert a user to a problem and provide instructions concerning operation of the powered latches 6A-6D. For example, the system 25 may provide a voice message "Attention, vehicle left hand door latch is without power and will not allow exit, please use the back-up release handle as shown on your vehicle information screen" or other suitable message. The voice command may be provided in multiple languages. The system 25 may be configured to include a default language, and the system 25 may initially generate a voice command in the default language, followed by one or more additional languages.

Furthermore, the system may be configured to determine if the vehicle ignition was active with a valid cell phone, but none of the previously paired phones are detected in the vehicle. In these circumstances, the system 25 could assume the driver is not the owner, but rather a temporary driver. If one or more of the powered latches 6A-6D goes off-line and no paired phones are detected, the system 25 could utilize voice commands to coach a user concerning how to exit the vehicle utilizing emergency release lever 18, and/or the system 25 may provide voice information concerning the status of the child lock feature and information concerning unlatching the rear doors in the event the child lock feature is not fully operational. Furthermore, if one or more of the powered latches 6A-6D loses communication, and if no previously paired phone is detected, the system 25 may provide voice warnings or information in a default language, and then also provide warnings and/or information in the native or most common languages of the country or geographic region in which the GPS system determines that the vehicle is located.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a body;
   a door movably mounted to the body;
   a controller configured to receive data concerning vehicle operating conditions;
   an interior handle on the door;
   an electrical unlatch switch on the interior handle;
   at least one electrically powered door latch having a powered actuator that can be actuated by the controller to unlatch the electrically powered latch, wherein the electrically powered latch can also be unlatched mechanically without actuation of the powered actuator;
   an emergency release that is movably mounted to an inside of the vehicle door at a location that is spaced apart from the interior handle, wherein the emergency release is mechanically connected to the electrically powered latch such that movement of the emergency release mechanically releases the latch without actuation of the powered actuator; and
   a user communication device that is operably connected to the controller, wherein the user communication device comprises a display screen that provides text explaining the location of the emergency release; and wherein:
   the controller is configured to cause the powered actuator to unlatch the electrically powered latch when the electrical unlatch switch is actuated, and wherein the controller causes the user communication device to provide a user with information concerning the location of the emergency release if the controller determines that a predefined operating condition has occurred.

2. The vehicle of claim 1, wherein:
   the controller causes the user communication device to provide a user with information concerning the location of the emergency release if a vehicle mileage is below a predefined mileage.

3. The vehicle of claim 1, wherein:
   the predefined operating condition comprises a malfunction of the electrically powered door latch.

4. The vehicle of claim 1, wherein:
   the controller causes the user communication device to provide a user with information concerning the location of the emergency release upon detection of an infrequently used passive key fob.

5. The vehicle of claim 1, wherein:
   the controller causes the user communication device to provide a user with information concerning the location of the emergency release upon detecting a break in communication between the controller and the electrically powered latch.

6. The vehicle of claim 1, wherein:
   multiple actuations of the electrical unlatch switch are required to unlatch the electrically powered latch; and
   the display screen provides information concerning the number of multiple actuations of the unlatch switch that are required to unlatch the electrically powered latch.

7. The vehicle of claim 1, wherein:
   the vehicle shifts to a back-up power mode and utilizes an emergency power supply capable of actuating the powered actuator if a main electrical power supply of the vehicle fails;
   the vehicle includes an exterior unlatch switch;
   the electrically powered latch can be latched by actuating the exterior unlatch switch for at least a required predefined period of time; and wherein:
   the user communication device is configured to provide a user with information concerning the required predefined period of time if the system has shifted to the back-up power mode.

8. The vehicle of claim 1, including:
   a transmitter configured to cause a portable phone to provide information concerning the location and/or operation of the emergency release.

9. The vehicle of claim 8, wherein:
   the transmitter is configured to send a text message to the portable phone concerning the location of the emergency release.

10. The vehicle of claim 1, wherein:
    the user communication device comprises a speaker that is configured to generate an audio signal to a user.

11. The vehicle of claim 10, wherein;
    the display screen provides the text after the speaker provides an audio signal prompting a user to look at the display screen.

12. The vehicle of claim 10, wherein:
    the speaker provides audio information concerning the location and/or operation of the emergency release.

13. The vehicle of claim 12; wherein:
    the vehicle includes a child lock feature and a transmitter that is configured to wirelessly communicate with one or more portable phones and wherein the controller is configured such that if it does not detect a portable phone in the vehicle that it has previously communicated with and if communication with the electrically powered latch has been interrupted, the controller causes the user communication device to provide audio information concerning at least one of: a) the location and/or operation of the emergency release; and b) the status of the child lock feature.

14. The vehicle of claim 13, wherein:
    the audio information is provided in at least two languages.

15. The vehicle of claim 1, wherein:
    the at least one electrically powered latch comprises four electrically powered latches configured to selectively retain left and right front and rear doors in closed positions.

16. The vehicle of claim 1, wherein:
    the door includes a pocket located below the interior handle; and
    the emergency release comprises a lever that is rotatably mounted to the door inside the pocket.

17. A vehicle comprising:
    a body;
    a door movably mounted to the body;
    the door having an inner side having a door handle having an electrical unlatch switch, the door including a pocket located below the door handle;

a controller configured to receive data concerning vehicle operating conditions;

at least one electrically powered door latch having a powered actuator that can be actuated by the controller to unlatch the electrically powered latch upon actuation of the electrical unlatch switch;

an emergency release movably mounted to the door inside the pocket, wherein the emergency release is mechanically connected to the electrically powered latch to mechanically release the latch upon movement of the emergency release;

a user communication device that is operably connected to the controller, wherein the user communication device comprises a display screen that provides text explaining the location of the emergency release; and wherein:

the controller causes the user communication device to provide a user with information concerning the location and/or operation of the emergency release if the controller determines that a predefined operating condition has occurred;

an unlatch switch that can be actuated by a user; and wherein:

the electrically powered door latch comprises a rear door latch having a child lock feature, and wherein a predefined plurality of actuations of the unlatch switch are required to unlatch the electrically powered door latch if the child lock feature has been deactivated due to a failure in the system; and the user communication device is configured to notify a user that the child lock feature has been deactivated and to provide a user with information concerning the required predefined plurality of actuations.

18. The vehicle of claim 17, including:

a child lock activation input device that can be actuated by a driver of the vehicle located in a driver's seat of the vehicle; and:

the user communication device indicates that the child lock feature has been deactivated when a vehicle ignition key-on cycle is initiated unless the failure causing deactivation of the child lock feature has been resolved.

19. The vehicle of claim 17, wherein:

the failure in the system comprises at least one of a loss of data transfer and a loss of electrical power.

20. The vehicle of claim 17, including:

a transmitter configured to cause a portable phone to provide information concerning the predefined plurality of actions.

21. The vehicle of claim 20, including:

a back-up electrical power supply operably connected to the transmitter, and wherein:

the transmitter is configured to utilize power from the back-up electrical power supply to transmit information to a portable phone whereby the portable phone provides information concerning the location of the emergency release and/or the predefined plurality of actions and/or information concerning deactivation of the child lock feature.

22. The vehicle of claim 21, wherein:

the transmitter transmits the information in the form of a text message.

23. A method of providing a user of a vehicle having a powered door latch with information concerning a movable mechanical emergency release on a door in a door pocket, comprising:

causing a controller to determine if a predefined malfunction preventing powered unlatching has occurred;

wherein the controller causes a screen inside the vehicle to display text explaining the location of the emergency release in the door pocket if a predefined malfunction has occurred.

* * * * *